Sept. 3, 1929.  G. O. HODGE  1,726,985

MEANS FOR RIVETING BALL BEARING CAGES

Filed April 30, 1924

Inventor
George O. Hodge
By his Attorney

Patented Sept. 3, 1929.

1,726,985

UNITED STATES PATENT OFFICE.

GEORGE O. HODGE, OF BRISTOL, CONNECTICUT.

MEANS FOR RIVETING BALL-BEARING CAGES.

Application filed April 30, 1924. Serial No. 710,115.

This invention relates generally to ball bearings and more particularly to means and a method for assembling ball bearings of the multiple row type.

In the manufacture of ball bearings of the double row type it is the practice to make use of a ball cage structure consisting of two annular metal strips formed to fit the opposite lateral faces of an intervening row of balls, the metal strips being rigidly connected by stay rods extending across the row between the balls. The opposite ends of the stay rods are reduced in cross-section and are passed through openings in the strips and upset or riveted into locking engagement therewith.

Considerable difficulty has been found in riveting the cage members in placing since it is obvious that the riveting operation must be performed when the balls and cages are in assembled condition with the inner ends of the stay rods in a relatively inaccessible position. It is a general object of the present invention to provide means and a method for effectively supporting the cage stay rods of a double row bearing while riveting the outer ends of a series of the stay rods in a single operation.

The invention includes the provision of a series of anvil members adapted to be placed in position in the bearing before the second row of balls and the accompanying cage members have been assembled. When the assembly has been completed the inner ends of the whole series of stay rods are provided with cooperating anvil members which effectively support the stay rods during a riveting operation in which all the stay rods may be simultaneously acted upon in a single actuation of a suitable press. Following the riveting operation the series of anvil members, which are preferably linked together to form a flexible chain are withdrawn through an opening in one of the race members and are available for use in the assembly of another bearing.

In the drawings, in which a preferred embodiment of the invention has been selected for illustration, Figure 1 is a sectional view of a portion of a double-row bearing following the placing of a row of balls in position.

Figure 1:
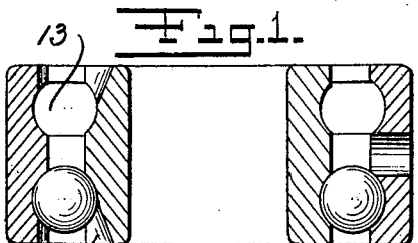

Referring to the drawings for a more detailed description of the invention, there is illustrated a double row ball bearing having an inner race member 10 and an outer race member 11 provided with the usual raceway grooves 12 and 13 in which a double set of balls 14 and cage members 15 are placed. The cage members 15 consist of annular strips of metal 16 formed to fit the lateral faces of an interposed row of balls and stay rods 17 extending across the space between the cage rings and are riveted thereto in order to hold the cage members in position and separate the balls within the row.

The present invention has to do with the riveting together of the cage member parts after their assembly in the bearing and the invention includes the provision of a series of anvil members adapted to be placed in interposed relation between the inner ends of the oppositely extending stay rods in the two sets of cages 15. The device used for this purpose consists of a series of anvil members 18 joined together by link members 19 in a spaced apart relation corresponding to the distance separating the stay rods 17. The link members 19 are provided with eyes or loops at their extremities which engage in a groove 20 intermediate the ends of the anvil members. This arrangement provides a jointed connection and with the result that the series of anvil members as a whole takes the form of a flexible chain which readily conforms to the circular path in which it is placed and lends itself to ready withdrawal through an opening 21 that is provided for the purpose midway between the lateral edges of the outer race ring.

Figure 2:
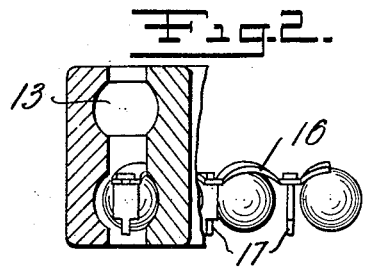
Figure 2 is a view similar to Figure 1 showing the assembly following the placing of a cage ring with attached stay rods in position on the row of ball members.
Figure 3:
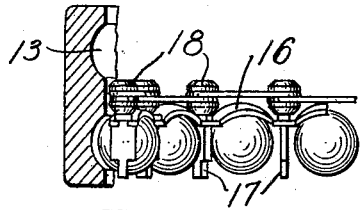
Figure 3 is a view similar to Figure 1 showing the assembly following the placing of the improved anvil device in position.

In assembling a bearing of the type described a row of balls is first introduced between the race rings as shown in Figure 1 of the drawing by way of the side filling openings 22 provided for this purpose. Following the introduction of the row of balls a cage ring 16 with stay rods riveted thereto is dropped into place as indicated in Figure 2 of the drawing with the stay rods extending downwardly between the balls in the raceway grooves 13. This is followed by the introduction of the linked anvil members 18 which rest upon the riveted end of the stay rods and have a slight clearance on the inner or upper face of the cage ring 16 as is clearly indicated in Figure 3 of the drawing. The next step in the operation consists in the dropping into position between the race rings of another cage ring 16 with the stay rods 17 thereof projecting upwardly or in the opposite direction to that taken by the stay rods in the lower ring as is indicated in Figure 4 of the drawing.

The presence of the anvil members 18 facilitates the positioning of the second cage ring 16 in that the depressions in the ring naturally register with the anvil members and this serves to automatically produce an aligned or registered relation of the oppositely extending stay rods 17 as will be clear.

Figure 4:
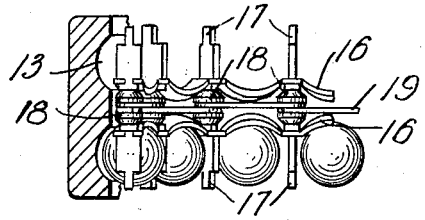
Figure 4 is a view similar to Figure 1 showing the assembly following the placing of the second ball cage in position.
Figure 5:
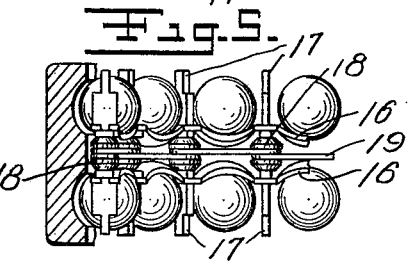
Figure 5 is a similar view showing the condition following the placing of the second row of ball members in position.
Figure 6:
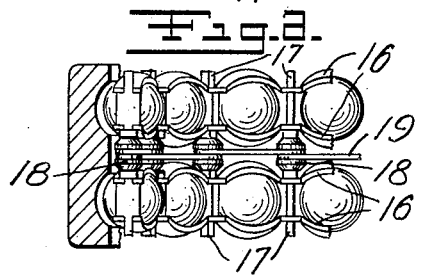
Figure 6 is a similar view following the placing of the outer cage members in position.

The introduction of the second cage ring member 16 as in Figure 4 is followed as in Figure 5 by the placing of the second row of ball members in position by way of the side filling openings 22 in the corresponding side of the race rings. The next step in the operation consists in the placing in position of the outer cage rings 16 in such manner that openings 24 therein receive the reduced end portions 25 of the oppositely disposed stay rods which project beyond the outer faces of the cage rings as is indicated in Figure 6 of the drawing.

Figure 7:
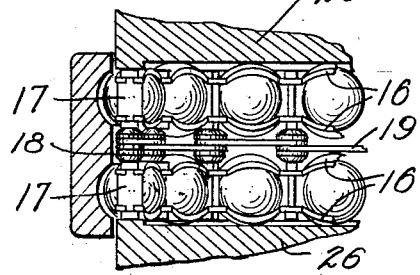
Figure 7 is a similar view showing the manner of effecting a riveting operation.
Figure 8:
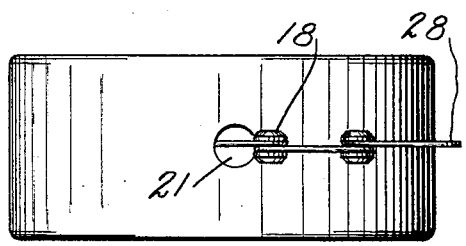
Figure 8 is a side view of a bearing showing the manner of removing the anvil device therefrom.

With the parts thus assembled the device is transferred to a riveting press or other device in which the reciprocating head members 26 are forced toward each other to engage and upset the outer extremities 25 of the stay rods 17 as is shown in Figure 7 of the drawing. As will be seen the anvil members 18 receive the impact of the press and form a rigid support which results in the upsetting or riveting of the outer extremities of the stay rods against the outer faces of the cage rings 16 and thereby effects the desired cage riveting operation.

Figure 9:
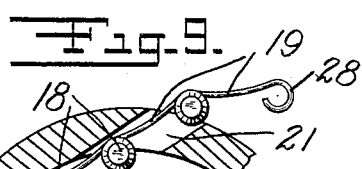
Figure 9 is a partial view in section showing a preferred form of opening through which to effect the removal of the anvil device.
Figure 10:
Figure 10 is a view in side elevation and on an enlarged scale of an anvil member element.

Following the riveting operation described the assembled bearing is removed from the press and the chain of linked anvil members 18 is withdrawn from its position between the cages 15 through an opening 21 formed for the purpose preferably in the outer race ring 11. The opening 21 may take a radial direction or an angular or oblique direction as indicated in Figure 9 of the drawing to facilitate the ready removal of the linked anvil members from their position in the bearing. The end link member of the series is preferably formed with an eye or loop 28 for engagement by a suitable hook member to assist in the removal of the anvil members from their position when the riveting operation has been completed.

It will be seen that by the use of the connected series of anvil members referred to a riveting operation which in a single actuation of the press upsets the whole series of stay rod extremities in both cages greatly reduces the number of operations and time required in the assembly of the ball bearing parts. This results in a corresponding economy in the cost of production of the bearing and at the same time produces a uniform upsetting or riveting of the complete series of stay rods which cannot be produced when but one or two stay rods are riveted at one time as is characteristic of the use of an anvil member or tool which is inserted through an opening in the outer race ring between the inner ends of a pair of stay rods heretofore known in the art.

What I claim is:

1. In riveting the stay rods of double-row ball bearing cages wherein the balls are in spaced sets confined between inner and outer imperforate bearing members and each ball set is provided with a cage, each cage having an inner and an outer ball retaining member held together by means of stay rods, which rods are completely headed on their inner ends, the combination of means for heading the outer ends of such rods comprising anvils adapted to be inserted through an opening in one of the bearing members, and lie between adjacent stay rods of the spaced sets and bear against the completed end of such rods, and a lower die and an upper die adapted to simultaneously upset and rivet the outer ends of such stay rods as the same are backed up by the said anvils.

2. In riveting stay rods as described in claim 1, the said opening in the bearing member through which the anvils are inserted being in the form of a passage that is directed tangentially through the wall of the bearing member.

3. In riveting the stay rods of double-row ball bearing cages wherein the balls are in spaced sets confined between inner and outer imperforate bearing members and each ball set is provided with a cage, each cage having an inner and an outer ball retaining member held together by means of stay rods, which rods are completely headed on their inner ends, the combination of means for heading the outer ends of such stay rods comprising anvils adapted to be inserted through a tangential opening in one of the bearing members, and lie between adjacent stay rods of the spaced sets and bear against the completed ends of such rods.

4. An anvil device for use in riveting double-row ball bearing cages when in assembled condition comprising a series of connected anvil members formed and arranged to be interposed between the two sets of cages whereby simultaneous riveting action may be produced.

5. An anvil device for use in riveting double-row ball bearing cages when in assembled condition comprising a linked-together series of anvil members formed and arranged to be interposed between the two sets of ball cages during the assembly thereof whereby to produce simultaneous riveting action.

6. In a device for use in riveting the stay rods of double-row ball bearing cages, a plurality of linked together anvil members formed to conform substantially to the curvature of the restricted portions of the cage members wherein the stay rods are seated, said anvil members being adapted to be interposed between the confronting ends of the stay rods, whereby to rivet the ends of all the stay rods in a single operative stroke.

7. An anvil for use in riveting the stay rods of double-row ball bearings and adapted to be positioned during the riveting between the opposed ends of stay rods of the opposite ball cages, and said anvil being generally of cylindrical form with conical end portions that merge with flat end faces that engage with the stay rods.

8. In riveting the stay rods for the cage members of double-row radial ball bearings, said rods alternating with the balls, said members having seats for the balls and platforms intermediate said seats that are perforated to admit said rods, said platforms being nearer together for the individual cages than the diameter of said balls and cooperating with adjacent portions of the material of said members to provide a recess-like space on the outer side of the cage, a set of anvils positioned between the two cages of the opposed ball-rows and operatively housed individually within the space defined by opposed platforms and adjacent portions of such opposed cages.

GEORGE O. HODGE.